United States Patent [19]

Thomas et al.

[11] Patent Number: 5,082,477
[45] Date of Patent: Jan. 21, 1992

[54] SEPARATOR FOR SEPARATING SOLIDS FROM AN ASCENDING, SOLIDS-LADEN GAS STREAM

[75] Inventors: Gerhard Thomas; Walter Thielen, both of Gummersbach, Fed. Rep. of Germany

[73] Assignee: L & C Steinmüller GmbH, Gummersbach, Fed. Rep. of Germany

[21] Appl. No.: 598,616
[22] PCT Filed: Apr. 15, 1989
[86] PCT No.: PCT/EP89/00409
  § 371 Date: Nov. 26, 1990
  § 102(e) Date: Nov. 26, 1990
[87] PCT Pub. No.: WO89/10516
  PCT Pub. Date: Nov. 2, 1989

[30] Foreign Application Priority Data

Apr. 19, 1988 [DE] Fed. Rep. of Germany ....... 3813054

[51] Int. Cl.⁵ ............................................. B01D 45/00
[52] U.S. Cl. ................................. 55/443; 55/DIG. 37
[58] Field of Search ................... 55/442, 443, DIG. 37

[56] References Cited

FOREIGN PATENT DOCUMENTS 3640377 6/1988 Fed. Rep. of Germany .
2046886 11/1980 United Kingdom .

*Primary Examiner*—Bernard Nozick
*Attorney, Agent, or Firm*—Robert W. Becker & Associates

[57] ABSTRACT

In known separators, some of the solids trapped in the trapping chutes may be prevented from being discharged at the wall due to by-pass currents at the lower end of the trapping chutes. To improve the discharge of the separated dust, the lower end of each trapping chute that is adjacent to the wall is provided with an outlet channel piece extending to the wall and having a slot-like outlet opening resting at the wall and opening downward; and sheet metal deflectors are arranged between the outlet channel pieces of each layer of trapping chutes at a distance from each other and from the wall, which form between them delimit slots for the passage of gas. The separator is preferably used to separate solids from the ascending flue gas in a fluidized bed furnace.

11 Claims, 4 Drawing Sheets

FIG—4

SEPARATOR FOR SEPARATING SOLIDS FROM AN ASCENDING, SOLIDS-LADEN GAS STREAM

BACKGROUND OF THE INVENTION

The present invention relates to a separator for separating solids from a gas flow, especially solids in an ascending gas flow from a fluidized bed furnace, that contains solids and ascends in a channel delimited by multiple walls, whereby the separator comprises at least two layers of staggered trapping chutes of an essentially U-shaped cross-section, with the trapping chutes being slanted towards a wall and open against a flow direction of said gas flow and having chute-like pockets provided at the free ends of their inner flanks which guide solids separated by the trapping chutes towards the wall.

Such a separator has been proposed in the German patent application P 36 40 377.6-41, filed Nov. 26, 1986, in which the lower ends of the trapping chutes, which are adjacent to the walls, end in a common collecting or combining funnel or end at the wall. The distributing funnel may be equipped with a downwardly extending recirculating channel. However, the effectiveness of the separator may be reduced by by-pass currents in the recirculating arrangement for the separated solids and/or between the individual trapping chute layers. These by-pass currents may be generated by pressure gradients above the layers of trapping chutes.

It is therefore an object of the present invention to provide a separator of the aforementioned kind in which the removal of the separated dust is improved.

SUMMARY OF THE INVENTION

This object is achieved by providing outlet channel pieces at the lower end of each trapping chute adjacent to the wall with the outlet channel pieces extending to the wall and having a slot-like outlet opening at the wall which opens downward, and by providing, between each outlet channel piece of each layer of trapping chutes, sheet metal deflectors which are spaced from one another and spaced from the wall and delimit between them at least one slot for the passage of gas.

The outlet channel piece ascertains a safe reversal and recombination of the two drainage flows discharged from the chute-like trapping pockets. The possible combination of the two discharge flows into one common discharge flow of a higher concentration in conjunction with the slot-like outlet openings improves the dust recycling against the gas flow ascending along the wall.

Due to at least one slot defined between the sheet metal deflectors, a pressure equilibration between the two individual trapping chute layers is achieved, on the one hand, and, to a large extent, a reduction of the circulation of the by-pass currents in one individual layer is made possible, on the other hand.

Preferably, the edges of the outlet openings of the outlet channel pieces that are adjacent to the wall, and the edges of the sheet metal deflectors are angled downward in order to provide defined stream conditions. The outlet opening of each outlet channel piece may be delimited by the wall, i.e., the wall forms the face of the outlet channel piece. It is also possible, however, to close the end of the outlet channel piece or connecting channel piece that faces the wall with a wear resistant sheet metal face in order to reduce erosion of the wall caused by the recycled solids.

In order to further improve the reversal of the separated solids from the trapping chute in the direction of the wall, it is advantageous to slant the connecting channel piece further downward relative to the trapping chute which is already slanted towards the wall.

To prevent a by-pass current against the transport direction of the solids, which may be caused by the connecting channel piece, it is advantageous, to at least partially close the trapping chute at its end facing the connecting channel piece leaving openings that correspond to the size of the outlet cross-sections of the trapping pockets. Thereby the by-pass current may be adjusted via the degree of closing of the trapping chute.

It is also advantageous that the slant and, if necessary, the position of the sheet metal deflectors, that are arranged spaced from each other, corresponds to the slant and, if necessary, the position of the top portion or the bottom portion of the connecting outlet channel piece or outlet channel piece.

The distance of the edges, especially the angled edges, of the sheet metal deflectors from the wall is smaller in the top layer than in the bottom layer of the trapping chutes, in order to allow the downward passage of the increasing amount of solids. The distance is therefore dependent on the cross-sectional size of the trapping pockets and the number of trapping chute layers. Since the top portion of the connecting channel pieces are closed, the separated solids descend through the slots formed between the edges of the sheet metal deflectors and the wall.

The individual layers, comprising the trapping chutes, the connecting channel pieces and the sheet metal deflectors, which are arranged in the intermediate spaces between the connecting channel pieces, may be spaced at pre-determined distances from each other, thereby forming a gas flow passage slot between them in the vicinity of the wall.

In order to avoid solids deposits at the wall in the wall contact area, especially in the lower trapping chute layers, and to limit currents of the solids flows which must be discharged downward in a compact form, the top portion of the connecting channel pieces, at least of the lower layer of trapping chutes, may be equipped with roof-like attachments or the top portion itself may be roof-shaped.

The invention relates also to an apparatus for separating and discharging of solids with a separator of the aforementioned kind.

It is advantageous to combine the descending solids discharged from the separator and to guide them into the corners at either side of the wall.

This is especially advantageous when the separator is used in conjunction with fluidized bed furnaces.

In order to achieve this, the wall, below the separator, is provided with at least one roof-like attachment which guides the flows, that are discharged from the separator and descend along the wall, into the corners at either side of the wall of the channel. Thereby two highly concentrated solids flows are formed which maintain their contour in the counter stream of the ascending gas flow containing solids, even when descending over long distances.

The slant of the trapping chute itself depends on the angle at which the solids or dust to be separated discharge and is usually between 30°–60°, whereby an angle of 45° is commonly used.

The flow and the discharge of the solids from the individual trapping chutes and from the entire separator, against the created by-pass currents, is improved by the connecting channel pieces and the arrangement of the sheet metal deflectors between them, which function as guide sheets for the dust and the air. Special furnace cross-section extensions for forming collecting and distribution means in the separation area, which would lead to difficult and expensive channel wall deformations, are unnecessary.

BRIEF DESCRIPTION OF THE DRAWINGS

The present invention will now be described in with the aid of the accompanying drawings, in which.

DESCRIPTION OF PREFERRED EMBODIMENTS

Figure 1:
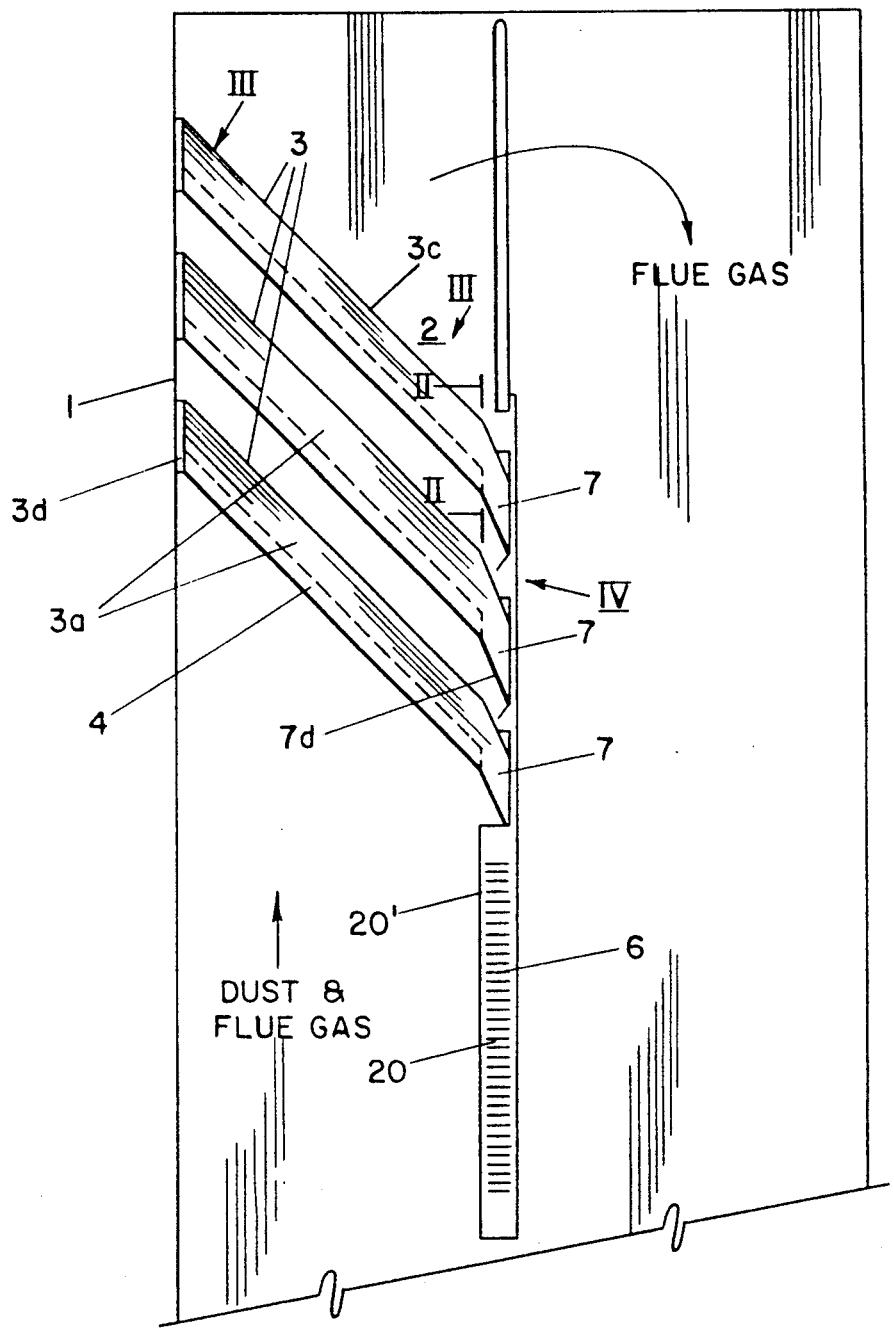
FIG. 1 is a cross-sectional view of the furnace of a highly expanded fluidized bed furnace having a separator with three layers of trapping chutes and, below the trapping chutes, a deflection device for deflecting the solids in two opposite corners of the furnace.

In the furnace 1 of a fluidized bed furnace reactor, represented in FIG. 1, the flue gases containing solids ascend and enter a separator 2 having three spaced layers of trapping chutes 3. The trapping chutes 3 of one layer are staggered relative to the trapping chutes of the adjacent layer, resulting in a so-called labyrinth separator. The individual trapping chute 3 comprises two vertical side walls 3a and 3b and a top portion 3c, resulting essentially in a U-shaped cross-section. The free edges of the side walls 3a and 3b are provided with chute-like trapping pockets 4 (see FIGS. 2 and 3). The right end (with respect to FIG. 1) of the individual trapping chute 3 is partially closed by a sheet metal cover 5 in the area of the chute-like trapping pocket 4 and by a cover plate 3d at the other end. As may be seen in FIG. 1, the trapping chutes 3 are slanted and guide the separated solids to a furnace wall 6 to the right. Between the furnace wall 6 and the trapping chutes there are provided connecting channel pieces 7 which are slanted further relative to the slant of the trapping chutes 3.

The connecting channel pieces 7 comprise (cf. also FIGS. 3 through 6) side walls 7a and 7b a top portion 7c and a bottom portion 7d.

The top portion 7c extends from the end of the trapping chute 3 to the furnace wall 6. The bottom portion 7d has an angled portion 7d' so that between the angled edge 8, the two side walls 7a and 7b, and the furnace wall 6 a slot-like outlet opening is created. In order to avoid erosion of the wall, there may be a sheet metal face 7e provided (cf. FIGS. 3 and 6, top portion).

In each individual layer, between the neighboring side walls 7b and 7a of adjacent connecting channel pieces 7, a top sheet metal deflector 10 and a bottom sheet metal deflector 11 are provided adjusted to the same position and angle of the top portion 7c, respectively the bottom portion 7d. The sheet metal deflectors are equipped, like the bottom portion 7d, with an angled portion 10' and 11', whereby the edges 12 and 13 are spaced from the wall 6 to form slots 14 and 15.

Between the free edges of the angled portion 7d' and 11d' and the surface of the sheet metal deflector 10 and the top portion 7c, respectively, a continuous slot 16 is formed.

Figure 4:
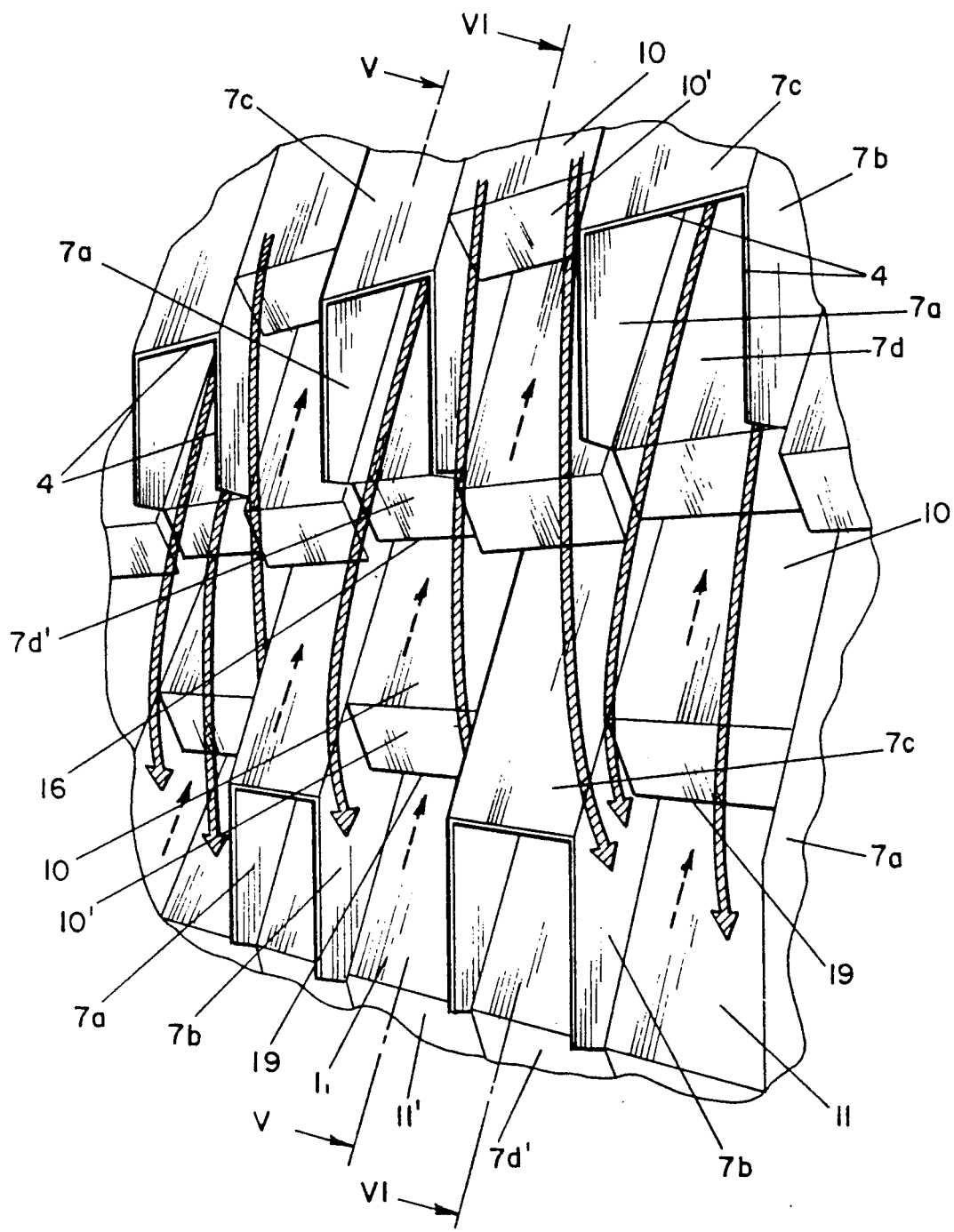
FIG. 4 is a perspective partial top view in the direction of the arrow IV in FIG. 1.
Figure 5:
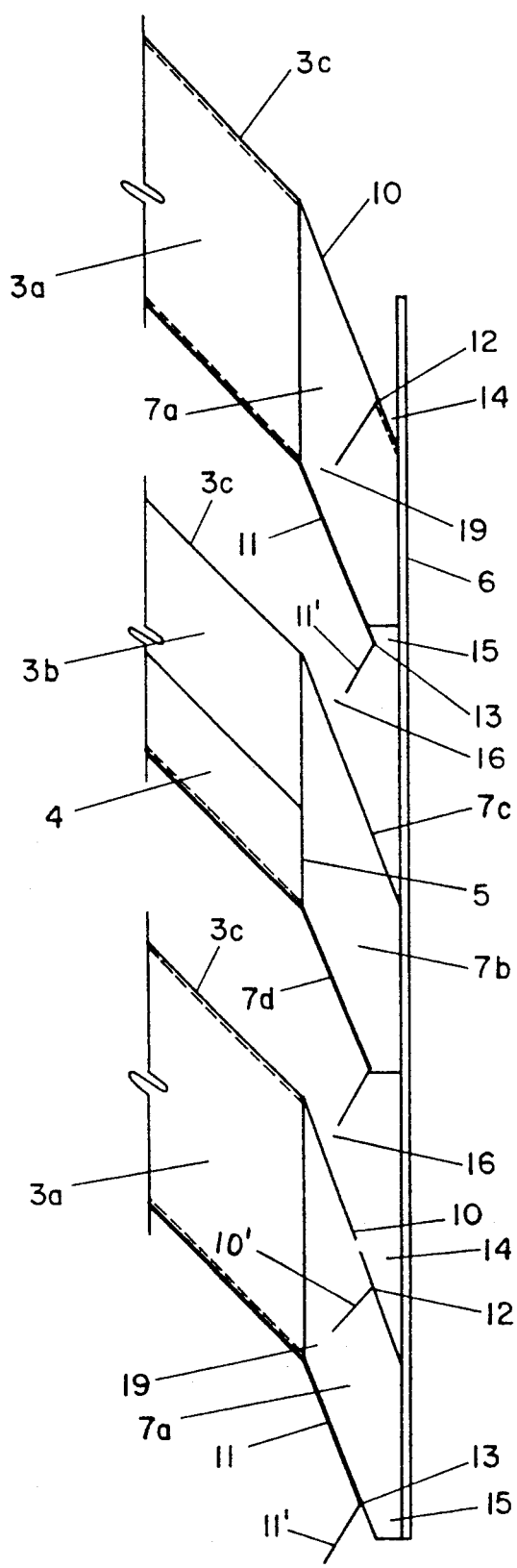
FIG. 5 is a cross-sectional view of the arrangement according to FIG. 4 along the line V—V.

In the perspective view according to FIG. 4, the solid lines represent the flow of the solids, which are discharged from the outlet openings 9. The thick lines delimit the area in which the solids are discharged. So as not to complicate the drawing, the even spreading of the flows discharged from the pockets 4, after passing the outlet openings is not represented. The sheet metal deflectors 10 especially serve also as a dust deflector, because they deflect the dust that reaches those deflectors.

Figure 6:
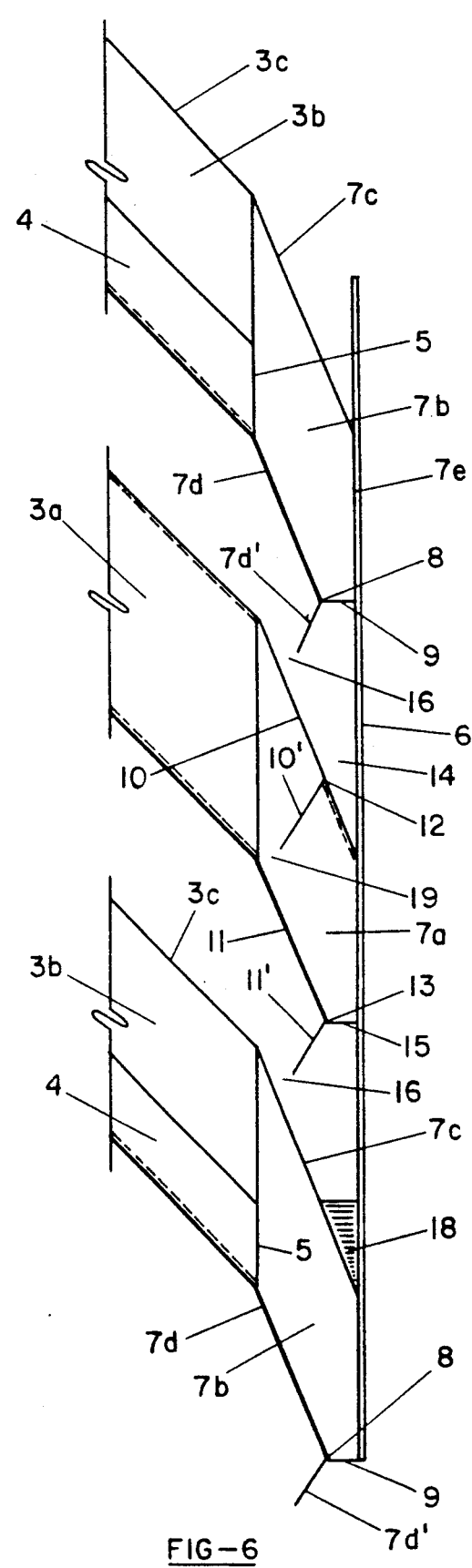
FIG. 6 is a cross-sectional view along the line VI—VI in FIG. 4.

As shown in FIG. 6, it is advantageous to provide a roof-like attachment 18 on the otherwise planar top portion 7c, at least at the lower layers of trapping chutes 3, in order to avoid dust deposits in the contact area of the lower trapping chute layer or layers with the furnace wall 6. This attachment may be replaced by respective deformations of the top portion 7c itself. In FIG. 4, the partial gas flows along the furnace wall 6 which are portions of the ascending main gas flow are represented by dotted lines. They pass through the slots 16 and the individual slots 19 formed between the free edges of the angled portion 10' of the sheet metal deflector 10 and the sheet metal deflector 11. Only a small portion of gas passes through the outlet openings 9.

By the combined effect of the individual slots 19 and the slots 16, a pressure compensation between the individual layers of the trapping chutes 3 is achieved and a minimal circulation of the by-pass currents within one individual layer of trapping chutes 3 is ascertained at the same time. As may be seen from FIG. 5, the width of the slots 14 and 15 is increased from the top to the bottom in order to increase the outlet cross-section relative to the increasing amount of the separated solids. The increase in width from layer to layer depends on the size of the cross-section of the trapping pockets and the total number of layers of trapping chutes.

A preferred embodiment may be seen in FIG. 1, in which, below the separator 2, a deflection device 20 in the form of a roof-like attachment having a guide wall 20' is arranged parallel to the wall 6 whereby the roof top is located in the middle of the furnace wall 6, so that the solids discharged from the separator 2 are guided to the two corners at either side of the furnace wall 6.

Although the drawings of the present specification show only trapping chutes that are slanted, the individual trapping chute may also have the roof-like design disclosed in FIG. 7 of the aforementioned prior art document.

Figure 2:
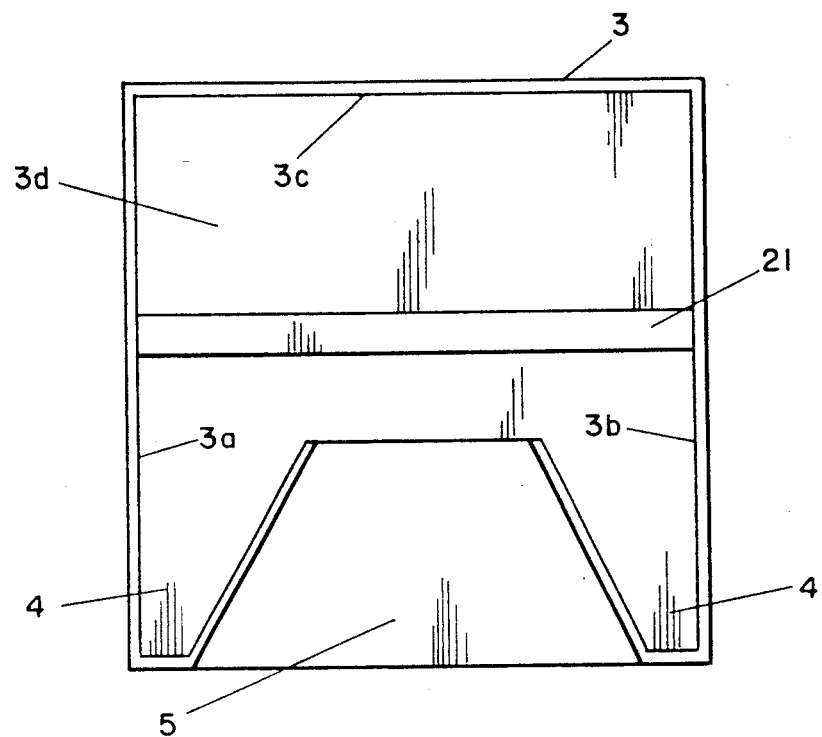
FIG. 2 shows a cross-sectional view of a trapping chute along the line II—II in FIG. 1.
Figure 3:
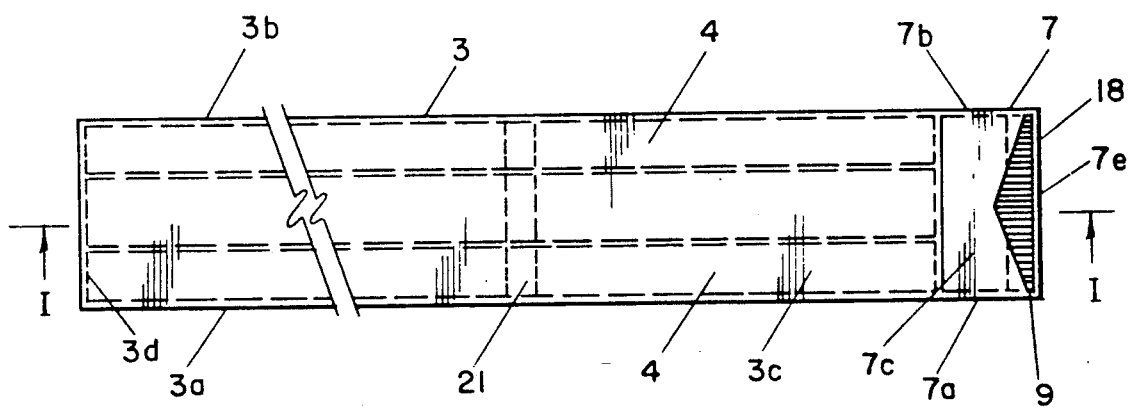
FIG. 3 is a top view of a trapping chute in the direction of the arrows III—III in FIG. 1.

It is also possible to have one or multiple reinforcements 21 inside the individual trapping chute, as shown schematically in FIG. 2.

Of course, the outlet channel piece 7 must not be manufactured separately from the trapping chute 3. The side walls and the top portion of the outlet channel piece 7 may be formed as integral parts of the trapping chute 3.

The present invention is, of course, in no way restricted to the specific disclosure of the specification and drawings, but also encompasses any modifications within the scope of the appended claims.

What is claimed is:

1. In a separator for separating solids from a gas flow that contains solids and ascends in a channel delimited by multiple walls, said separator comprising at least two staggered layers of trapping chutes of an essentially U-shaped cross-section which trapping chutes are slanted towards one of said walls and open against a flow direction of said gas flow and have chute-shaped pockets provided at free ends of inner flanks, which chute-shaped pockets guide solids separated by said trapping chutes towards said one wall, the improvement wherein:

an outlet channel piece is provided at a lower end of each of said trapping chutes, said lower end facing said one wall, which outlet channel piece extends to said one wall and has a slot-shaped downwardly open outlet opening one side of which is delimited at said one wall; and, between each of said outlet channel pieces of each of said layers of trapping chutes, two sheet metal deflectors are provided which are disposed above one another and are spaced from said one wall and from one another, whereby a slot for the passage of gas is formed.

2. A separator according to claim 1 in which an end of said outlet channel piece which is facing said one wall is provided with a wear resistant sheet metal face.

3. A separator according to claim 1 in which said trapping chute is slanted at a first angle downward relative to said wall and said outlet channel piece is slanted downward at a second angle, said second angle being greater than said first angle.

4. A separator according to claim 1 in which an end of said trapping chute that is facing said outlet channel piece is partially closed whereby outlet cross-sections of said trapping pockets remain open.

5. A separator according to claim 1 in which a slant and, if necessary, a position of said spaced sheet metal deflectors correspond to a slant and, if necessary, a position of a top portion or a bottom portion of said outlet channel piece.

6. A separator according to claim 1 in which a top portion of said outlet channel piece, at least in a lower one of said layers of trapping chutes, is provided with a roof-shaped attachment.

7. A separator according to claim 1 in which a top portion of said outlet channel piece is roof-shaped.

8. A separator according to claim 1 in which said layers of trapping chutes, with associated outlet channel pieces and sheet metal deflectors, are spaced from one another in a predetermined distance, thereby created between said layers slots for a passage of gas in a vicinity of said one wall.

9. A separator according to claim 1 in which an edge, opposite said one wall, of said outlet opening and edges, facing said one wall, of said metal sheet deflectors are provided with downwardly angled portions.

10. A separator according to claim 9 in which a distance of said edges of said sheet metal deflectors from said one wall is smaller in an upper one of said layers of trapping chutes than in a lower one of said layers of trapping chutes.

11. An apparatus for separating and discharging solids with separator for separating solids from a gas flow that contains solids and ascends in a channel delimited by multiple walls, said separator comprising:

at least two staggered layers of trapping chutes of an essentially U-shaped cross-section which trapping chutes are slanted towards one of said walls and open against a flow direction of said gas flow;

chute-shaped pockets provided at free ends of inner flanks of said trapping chutes, which chute-shaped pockets guide solids separated by said trapping chutes towards said one wall;

an outlet channel piece provided at a lower end of each of said trapping chutes, said lower end facing said one wall, which outlet channel piece extends to said one wall and has a slot-shaped downwardly open outlet opening, one side of which is delimited at said one wall;

two sheet metal deflectors provided between each of said outlet channel pieces of each of said layers of trapping chutes, which sheet metal deflectors are disposed above one another and are spaced from said one wall and from one another, whereby a slot for the passage of gas is formed; and at least one additional roof-shaped attachment provided at said one wall below said separator, which roof-shaped attachment deflects solid flows, discharged from said separator, along said one wall to two corners at either side of said wall.

* * * * *